United States Patent
Loeffler et al.

(10) Patent No.: US 6,668,671 B2
(45) Date of Patent: Dec. 30, 2003

(54) CONTROL SYSTEM FOR A MOTOR VEHICLE AUTOMATIC GEARBOX AND METHOD FOR OPERATING SAID CONTROL SYSTEM

(75) Inventors: Juergen Loeffler, Ludwigsburg (DE); Martin-Peter Bolz, Buehl (DE); Holger Huelser, Stuttgart (AT)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/111,087

(22) PCT Filed: Jun. 29, 2001

(86) PCT No.: PCT/DE01/02401
§ 371 (c)(1),
(2), (4) Date: Jul. 22, 2002

(87) PCT Pub. No.: WO02/16806
PCT Pub. Date: Feb. 28, 2002

(65) Prior Publication Data
US 2003/0014173 A1 Jan. 16, 2003

(30) Foreign Application Priority Data
Aug. 23, 2000 (DE) .......................................... 100 41 441

(51) Int. Cl.$^7$ .............................................. F16H 59/00
(52) U.S. Cl. ........................................... 74/335; 701/56
(58) Field of Search ............................... 74/335; 701/56

(56) References Cited

U.S. PATENT DOCUMENTS 4,338,666 A * 7/1982 Suzuki et al. ................. 701/56
4,788,892 A    12/1988 Komoda

FOREIGN PATENT DOCUMENTS

| DE | 43 11 886 A | 10/1994 |
| DE | 196 24 061 A | 12/1997 |
| DE | 197 49 132 A | 5/1998 |
| DE | 199 16 917 A | 11/1999 |

* cited by examiner

Primary Examiner—Dirk Wright
(74) Attorney, Agent, or Firm—Michael J. Striker

(57) ABSTRACT

In a control system (20) for an automatic motor vehicle transmission (10), with a number of gear selection modules (38, 40, 42), each of which is respectively designed to preset a target gear (zg) for a gear change depending on a number of operating parameters, through a suitable use of gear change prevention means, a particularly simple and transparent adaptation of the vehicle behavior to different driver requests should also be possible. To that end, the invention provides a number of analysis modules (46, 48, 50), each of which, in a respectively predeterminable operating situation, generates a suppression signal (u) for preventing a gear change, where each analysis module (46, 48, 50) is associated with a respective filter element (52, 54, 56), which enables the transmission of the respective suppression signal (u), depending on which gear selection module (38, 40, 42) has preset the target gear (zg). Preferably, a central control module (60) contains information, in the form of an applicable matrix for each analysis module (46, 48, 50), which indicates the target gear (zg)-presetting gear selection module (38, 40, 42) for which the suppression signal (u) is to be transmitted.

6 Claims, 2 Drawing Sheets

Figure 1:
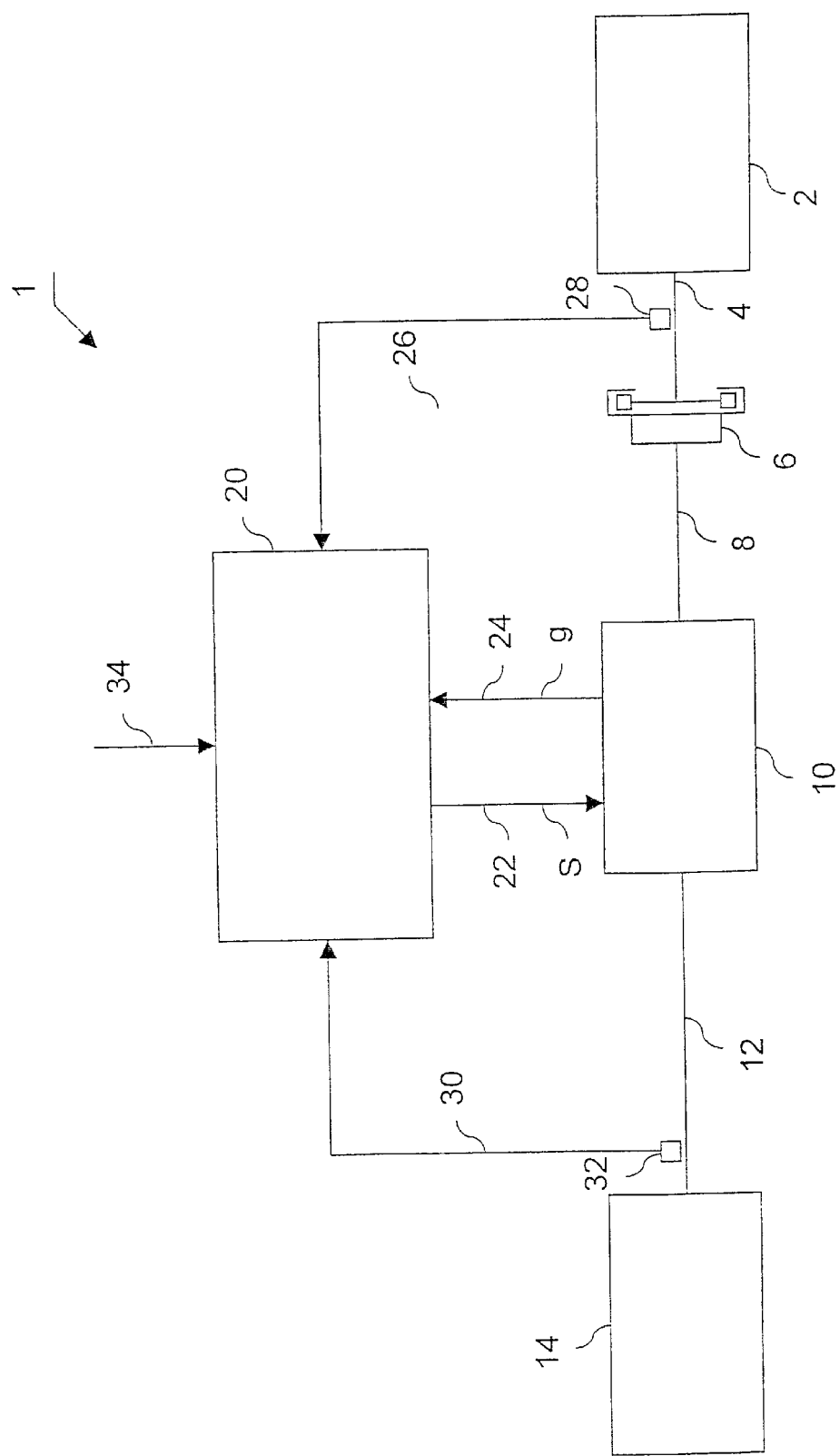

CONTROL SYSTEM FOR A MOTOR VEHICLE AUTOMATIC GEARBOX AND METHOD FOR OPERATING SAID CONTROL SYSTEM

The invention relates to a control system for an automatic motor vehicle transmission with a number of gear selection modules, each of which is designed for presetting a target gear for a gear change depending on a number of operating parameters. The invention also relates to a method for operating a control system of this kind.

In a motor vehicle with an automatic transmission, in particular with an automatic stepped transmission, a control system can be used in which an automatic control unit determines a gear that is suitable for each driving situation. In this case, depending on operating parameters characteristic of the driving situation, e.g. the vehicle speed, engine speed, and/or a lateral acceleration, the best gear for the driving situation determined from these parameters, is established as the target gear. The selection of the gear suitable to be the target gear can take place in particular through evaluation of characteristic curves regarding the throttle valve position and vehicle speed stored in the control system or also through determination of an optimal engine speed and subsequent discretization, i.e. association with the gear whose speed spectrum covers the optimal engine speed. If the target gear, which is determined in this manner, differs from the currently set gear, then a shift from the current gear into the target gear can be requested and a shifting command that triggers it can be given.

Alternatively or in addition to such a presetting of the target gear, there can also be a manual presetting of a target gear, which can be activated as desired by the driver. For example, the driver can input the target gear directly by means of a selector lever. A control system for the automatic motor vehicle transmission, which system is designed to take into account such a manual input, consequently includes a number of gear selection modules, each of which is designed for presetting a target gear under different boundary conditions. A first of these gear selection modules can preset the target gear after the fashion of an automatic control by evaluating measurement values, which are characteristic for the driving situation, as operating parameters. By contrast, another gear selection module can be designed to preset the target gear based on operating parameters manually input by the driver. Furthermore, additional gear selection modules can be provided, which are respectively adapted to other driving situations or operating parameters. As soon as one of these gear selection modules, which are connected in parallel in terms of logic, presets a target gear, then a gear change into this target gear can be executed.

However, despite the fact that a target gear has just been preset by one of the gear selection modules, in certain driving situations, it can be desirable not to shift into this target gear immediately. For example, when cornering at a relatively high speed, it can be desirable not to shift gears in order to prevent possible instabilities while negotiating the curve. In another case, it can be desirable to reliably prevent so-called oscillating gear changes. Oscillating gear changes can occur when one or more of the operating parameters, which determine gear selection, changes in a way that would produce a continuous series of upshifts and downshifts.

For such situation-dependent shift prevention, the control system can include a number of analysis modules, each of which, when a respectively predeterminable operating situation occurs, generates a suppression signal to prevent a gear change. Predeterminable operating situations that can be taken into account include, for example, situations that could lead to the above-mentioned oscillating gear changes, or a situation such as "high-speed cornering". The suppression signal can be consulted in the control system in such a way as to ignore the shifting command, which is generated as a result of the presetting of a target gear by one of the gear selection modules, or to prevent this shifting command from being executed.

DE 196 24 061 A1 has disclosed a method for controlling the gear changing of an automatic motor vehicle transmission, which is designed to prevent oscillating gear changes. With this method, a shifting command to change gears into a target gear is only executed when a number of predeterminable criteria are fulfilled. In order to prevent oscillating gear changes, there is the particular provision that as one criterion, a parameter-dependent minimum waiting time must pass after a gear change is executed before a new gear change can take place. However, on the one hand this method is only aimed at preventing oscillating gear changes and on the other hand, it does not directly provide an equal treatment of several gear selection modules, which are used to preset a target gear, and consequently can be used with only a limited degree of flexibility.

The object of the invention, therefore, is to disclose a control system for an automatic motor vehicle transmission of the type mentioned above, which through a suitable use of gear change prevention means, also permits a particularly simple and transparent adaptation of the vehicle behavior to different driver requests. The object is also to disclose a method particularly suited to operating the control system.

As regards the control system, this object is attained by providing a number of analysis modules, each of which, when a respectively predeterminable operating situation occurs, generates a suppression signal to prevent a gear change, where each analysis module is associated with a respective filter element, which enables the respective suppression signal to be transmitted depending on which gear selection module has preset the target gear.

The invention is based on the realization that a particularly simple adaptation of the vehicle behavior to different requests can also be achieved by suitably combining on the one hand, a number of possible sources for the respective parameter-dependent presetting of a target gear and on the other hand, a number of possible modules for assuring the prevention of gear changes in a demand-controlled fashion. In this connection, the integration of several gear selection modules, which is embodied in the form of a parallel processing of several sources and is designed to preset the target gear, permits a target gear to be correspondingly preset in each gear selection module depending on boundary conditions specifically stored there. On the other hand, the use of a number of analysis modules permits a specific suppression of undesirable gear changes to be respectively implemented in each analysis module. However, such a multi-channel system should assure that on the one hand, a positive cooperation of all of the components is maintained and that on the other hand, mutually contradictory presets and shifting commands are reliably prevented. To that end, for each analysis module, a filter module is implemented, which from this standpoint, stops or permits the transmission of the possibly generated suppression signal. In particular, there is the provision that the origin or source of the target gear preset is taken into account in the decision governing whether a target gear preset for generating a shifting command is to be transmitted or be suppressed due to specific driving considerations.

The filter elements can each be integrated directly into the corresponding analysis modules, in the form of a decentralized design. In this instance or in an alternative possible combination of filter elements to form central filter component, a central control module can suitably control the filter elements, thus assuring a systematic and consistent cooperation of the filter elements.

For a particularly high degree of flexibility of the control system, the central control module advantageously contains information, in the form of an applicable matrix for each analysis module, which indicates the target gear-presetting gear selection module for which a possibly generated suppression signal is to be transmitted. In this embodiment, the control module is embodied in the form of a criteria administrator. The form of the applicable matrix can also be used, for example, to store information indicating that a suppression signal generated by the "oscillating gear change prevention" analysis module is to be transmitted inside the control system if the presetting of the target gear originates from an automated control block as a gear selection module, but that the suppression signal is not to be transmitted if the presetting of the target gear originates from a selector lever as the gear selection module, which is actuated directly by the driver. Consequently, a presetting can be achieved in a particularly simple manner, which on the one hand, should reliably prevent oscillating gear changes in automatic gear selection, but which on the other hand, should immediately respond to the driver commands in manual gear selection.

Storing the association, which indicates the presetting gear selection module for which a suppression signal is to be transmitted and the analysis module to which it belongs, in the form of an applicable matrix in the central control module also assures a particularly high degree of flexibility and in particular, an ability of the control system to be used, which is not limited to the concrete vehicle type. For example, there can be a different prioritization of individual gear selection modules depending on the vehicle type: in a more sport-oriented vehicle type, for example, a manual gear presetting can be given a higher priority than an automatically generated gear presetting. In this case, when a target gear is manually preset, an oscillating gear change prevention can be suppressed, whereas when a target gear is automatically preset, an oscillating gear change prevention would be permitted. By contrast, in a vehicle type oriented more toward leisurely driving, an oscillating gear change prevention would be permitted with both manual and automatic presetting of the target gear. The control system, particularly with regard to its hardware components, can be used equally for both of these types, where the individual adaptation to the respective vehicle type can be executed merely in the form of the corresponding modification of the applicable matrix stored in the control module and can consequently be executed at a comparatively low cost.

In order to directly influence the suppression signals generated by the analysis modules, the central control module is suitably connected on the output side to each filter element associated with a respective analysis module, in order to transmit an enable signal. The enable signal can thereby "open" the filter element and consequently permit the transmission of a possibly existing suppression signal.

The taking into consideration of the origin of the presetting of the respective target gear can be achieved in a particularly simple manner in that, in an advantageous embodiment, each gear selection module, in chronological connection with the presetting of a target gear, respectively sends a signal, which identifies the presetting gear selection module, to the filter elements or to the central control module.

As regards the method, the stated object is obtained by virtue of the fact that a suppression signal generated by an analysis module is enabled for transmission depending on which gear selection module has preset the target gear.

The advantages achieved with the invention are comprised in particular in that by taking the origin of a preset for a target gear into account in the decision as to whether a suppression of the gear change into this target gear in the form of a gear change prevention should take place, it is possible in a particularly simple manner for there to be a logically parallel processing of different gear selections and a logically parallel processing of different criteria for gear change preventions. In addition, by storing the corresponding association in the form of an applicable matrix in the central control module, the control system can be used in a particularly varied and flexible manner, in particular, an especially simple subsequent adaptation to modified presets as well as an ability to be used universally, even in different vehicle types.

An exemplary embodiment of the invention will be explained in detail in conjunction with the drawings.

Figure 2:
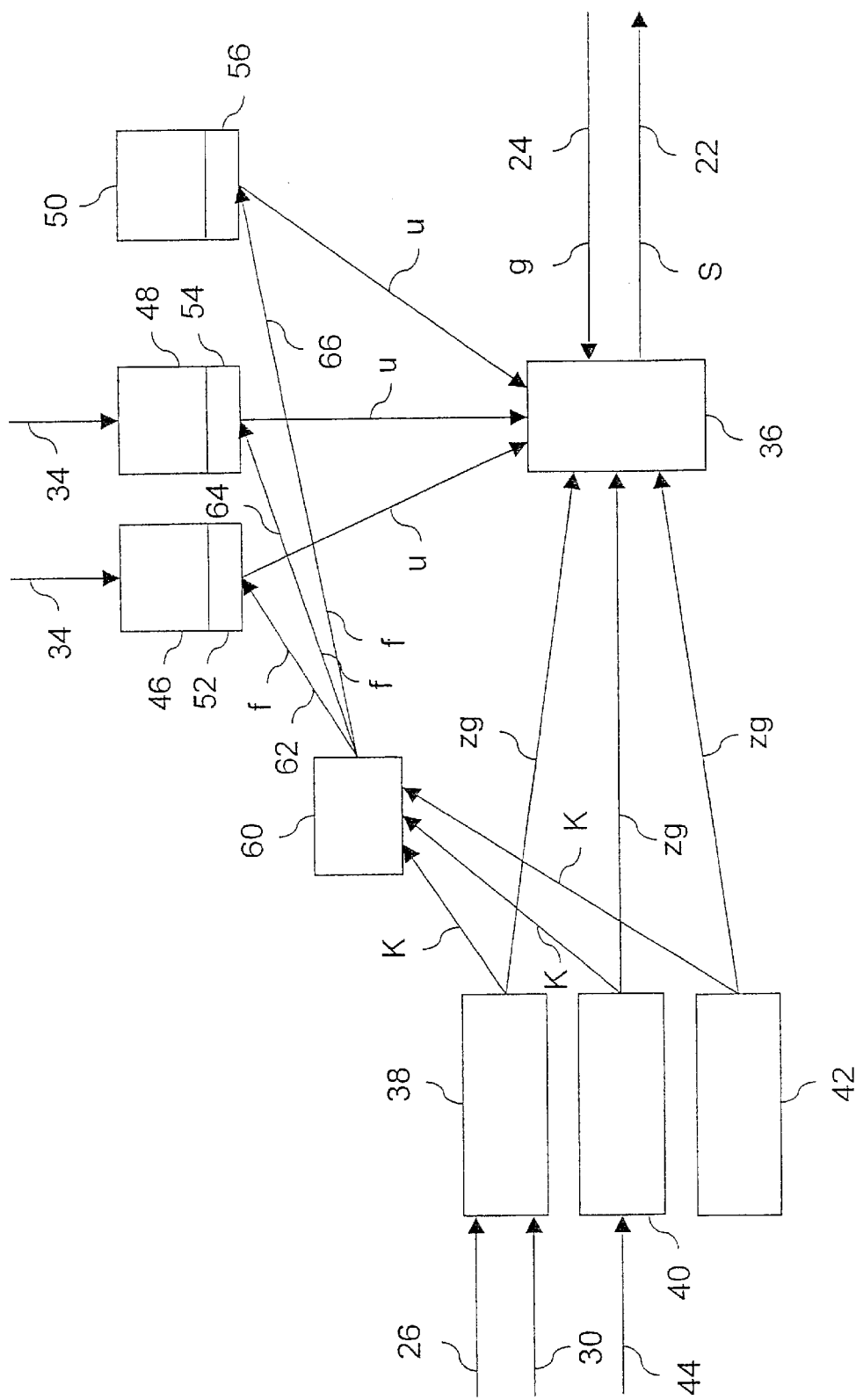

FIG. 1 schematically depicts a drivetrain of a motor vehicle with an associated control system, and FIG. 2 schematically depicts the control system according to FIG. 1 in detail.

Parts that are the same in both figures are provided with the same reference numerals.

The drivetrain 1 according to FIG. 1 has a vehicle motor 2, which is connected to a clutch 6 means of an input shaft 4. On the output side, the clutch 6 is connected by means of a shaft 8 to an automatic transmission 10, which in turn is connected on the output side or on the driven side, by means of a driveshaft 12, to a drive unit 14 of a motor vehicle, for example by means of a driving wheel set. In the exemplary embodiment, the clutch 6 is embodied as a hydrodynamic converter; alternatively, however, a servo-actuated friction clutch can also be provided or another clutch, which is suitable for producing a slipping, non-positive connection between the vehicle motor 2 and the drive unit 14. The automatic transmission 10 is embodied as a stepped transmission and has a number of predefined gears, each of which is associated with a fixed ratio of the speed of the shaft 8 to the speed of the drive shaft 12. Supplying a shifting command S to the automatic transmission can trigger a change between the gears.

For control purposes, the automatic transmission 10 is associated with a control system 20. The control system 20 is designed to determine the transmission ratio, which is desirable for the current driving situation, and to set it in the automatic transmission 10 by transmitting the corresponding shifting command S. To that end, the output side of the control system 20 is connected to the automatic transmission 10 by means of a signal line 22. On the input side, the control system 20 is connected via a signal line 24 to the automatic transmission 10, via a signal line 26 to a speed sensor 28 disposed on the input shaft 4, via a signal line 30 to a speed sensor 32 disposed on the driveshaft 12, and via a number of other signal lines, which are indicated by the arrow 34, to a number of other measurement value sensors that are not shown in detail.

As a result, an actual value for the currently set gear g can be supplied to the control system 20 via the signal line 24. The signal lines 26, 30 can be used to supply the control system 20 with actual values for the speed of the input shaft 4, the engine speed nm, or the speed na of the driveshaft 12. An actual value for the vehicle speed can therefore be derived from the speed na. Alternatively, the separate detection of the speed of each individual wheel of the vehicle can be provided, which in addition to the vehicle speed, also permits other relevant measurement quantities to be derived, such as slippage of a drive wheel. Furthermore, via the other signal lines indicated by the arrow 34, the control system 20 can be supplied with actual values of other relevant measurement values or operating parameters, for example by acceleration sensors, a throttle valve position, or a fuel supply, but also by an input device that allows the driver to manually input a desired gear.

The internal structure of the control system 20 is schematically depicted in FIG. 2. The control system 20 includes a main control unit 36, which is connected to the signal line 22 in order to output shifting signals S and is connected to the signal line 24 in order to read in the actual value of the gear g that is currently set.

On the input side, the main control unit 36 is connected to a number of gear selection modules 38, 40, 42. Each gear selection module 38, 40, 42 is respectively designed to preset a target gear zg depending on a number of specific operating parameters. When a preset target gear zg is supplied to the main control unit 36, this main control unit checks whether the target gear zg agrees with the current gear g of the automatic transmission 10. If this is not the case, then subject to the limitations that will be discussed in more detail below, the main control unit 36 transmits a shifting command S to the automatic transmission 10, which triggers the execution there of a gear change into the target gear zg.

The first gear selection module 38 is embodied the form of a conventional automatic gear selection device and is connected on the input side to the signal lines 26, 30, among others. Based on number of measurement values that can be supplied to it as operating parameters, in particular the speed na of the driveshaft 12 and a measurement value that is characteristic for the throttle valve position of the vehicle motor 2, and based on a stored engine speed nm that is particularly favorable for the operation of the vehicle motor, the first gear selection module 38 determines a desired speed ratio or transmission ratio of the automatic transmission 10. Based on this and through a suitable discretization and subsequent association with the speed ranges that are associated with the individual gears, the first gear selection module 38 determines a particularly suitable target gear zg, which it sends as a preset to the main control unit 36.

By contrast, the second gear selection module 40 is designed to process a desired gear as an operating parameter, which desired gear is directly input by the driver and can be input, for example, by means of a selector lever or tap lever. It immediately places the desired gear, which is supplied to it via an input line 44, in readiness as a target gear zg.

The third gear selection module 42 can, like other gear selection modules that may also be provided, can also be designed to prepare a preset for a target gear zg on another basis. Correspondingly, the main control unit 36 can always be supplied, in the form of a parallel processing, with one or more presets for a target gear zg.

The main control unit 36 is also connected on the input side to a number of analysis modules 46, 48, 50. The analysis modules 46, 48, 50 are designed in such a way that they generate a suppression signal u for a respective, specifically predeterminable operating situation. If the respective suppression signal u is supplied to the main control unit 36, then even if the preset of the target gear zg supplied to the main control unit 36 differs from the current gear g, a gear change does not occur and the transmission of the shifting signal S to the automatic transmission 10 is suppressed.

The first analysis module 46 here is embodied in the form of an oscillating gear change prevention means and particularly in the event of an essentially unchanged gas pedal position, should assure the prevention of a continuous series of gear changes into the next higher gear and then back into the next lower gear as a result of slightly changing external conditions. To that end, the analysis module 46 is connected to a number of other signal lines, which are symbolized by the arrow 34, via which the analysis module 46 can in particular be supplied with measurement values for vehicle speed, gas pedal position, engine speed nm, etc.

The second analysis module 48 is embodied as a gear change prevention means for cornering and particularly during rapid cornering, should prevent an excessively early gear change into the next higher gear, which could encourage a loss of traction or other temporary instability in performance. To the end, the second analysis module is particularly embodied for the detection of a "high-speed cornering" operating state and among other things, is connected on the input side to a number of other signal lines symbolized by the arrow 34 in such a way that it can be supplied with measurement values as operating parameters, which relate to the vehicle speed and lateral acceleration of the vehicle.

The third analysis module 50 can, like other analysis modules that may also be provided, be embodied in the form of a gear change prevention means for other standardizable operating situations. Correspondingly, the main control unit 36 can always be supplied, in the form of a parallel processing, with one or more suppression signals u in order to prevent a gear change.

In other words: the control system 20 is embodied in such a way that the main control unit 36 can be supplied, in the form of a parallel preparation, with presets for a target gear zg as well as suppression signals u for preventing a gear change, on respectively parallel channels. Particularly while processing suppression signals u, a linkage in the form of a logical "OR" is executed: if at least one suppression signal u is present in the main control unit 36, regardless of which analysis module 46, 48, 50 has generated it, then the transmission of the shifting signal S is suppressed and a gear change is consequently prevented.

The control system 20 is embodied in such a way that even in the event of a relatively high degree of complexity, on the one hand, inconsistencies in the processing are prevented and on the other hand, a particularly high degree of flexibility is possible in the adaptation to new or additional presets. To that end, each analysis module 46, 48, 50 is associated with a respective filter element 52, 54, 56. In the exemplary embodiment, each filter element 52, 54, 56 is integrated into the corresponding analysis module 46, 48, 50; however, the filter element can also be embodied separately from this analysis module and be connected after it with a view to processing the respective suppression signal u. Each filter element 52, 54, 56 is embodied in such a way that it enables the transmission of a suppression signal u generated by the associated analysis module 46, 48, 50, depending on which gear selection module 38, 40, 42 has preset the target gear zg.

This assures that the origin of the preset for the target gear zg is taken into account in the decision as to whether or not a certain gear change prevention can be permitted in connection with the gear change sought by the preset of the target gear zg. For example, the filter element 52 associated with the analysis module 46 can be designed for the following boundary conditions: the analysis module 46 is embodied as an oscillating gear change prevention means. Now the provision can also be made that an oscillating gear change prevention is to be viewed as permissible if the preset of the target gear zg was made by the automatic transmission control and consequently by the first gear selection module 38, but that an oscillating gear change prevention is to be viewed as impermissible if the preset of the target gear zg was made through manual input and consequently by means of the second gear selection module 40. An arrangement of this kind could correspond, for example, to a sport-oriented vehicle type with an active driver type, in which driver commands would essentially be handled with the highest priority.

In order to convert this boundary condition, the filter element 52, which is associated with the first analysis module 46 embodied as an oscillating gear change prevention means, can be embodied in such a way that a suppression signal u, which is generated by the first analysis module 46 when the danger of an oscillating gear changing is detected, is transmitted to the main control unit 36 in order to prevent a gear change if the target gear zg was preset by the first gear selection module 38, but not if the target gear zg was preset by the second gear selection module 40.

For a coordinated execution of different presets, the control system 20 has a central control module 60. On the output side, this central control module 60 is connected to the filter elements 52, 54, 56 in such a way that it can control them. In particular, the central control module 60 is connected on the output side to each analysis module 46, 48, 50 via a respective signal line 62, 64, 66, via which an enable signal f can be transmitted to the filter element 52, 54, 56, which is integrated into the respective analysis module 46, 48, 50. The filter elements 52, 54, 56 are embodied in such a way that a suppression signal u generated by the associated analysis module 46, 48, 50 is only transmitted to the main control unit 36 if a related enable signal f is present in the filter element 52, 54, 56.

On the input side, the central control module 60 is connected to each of the gear selection modules 38, 40, 42. The provision is made here that each gear selection module 38, 40, 42, when it gives a preset for a target gear zg to the main control unit 36, in chronological connection with this presetting, sends a signal K that identifies the presetting gear selection module 38, 40, 42 to the central control module 60. Consequently, in chronological coincidence with the target gear zg preset given to the main control unit 36, the central control module 60 contains information as to which gear selection module 38, 40, 42 is the origin of the preset. This also permits a possibly required generation and processing of a corresponding suppression signal u and its filtered transmission to the main control unit 36 in an updating fashion so that the target gear zg preset and a suppression signal u, which is possibly present in the main control unit 36, can be processed together in the desired fashion.

In order to take the origin of the target gear zg preset into account in a particularly suitable fashion in the decision as to whether or not a related suppression signal u should lead to a prevention of a gear change, the central control module 60 contains information, in the form of an applicable matrix for each analysis module 46, 48, 50, which indicates the target gear zg-presetting gear selection module 38, 40, 42 for which a corresponding suppression signal u is to be transmitted. The storage of this information in the form of an applicable matrix in the central control module 60 permits a particularly simple exchange of this information and consequently permits a particularly simple adaptation of the characteristics of the control system 20. In particular, this also permits an especially high degree of flexibility of the control system 20 and its ability to be used, even in different vehicle types.

What is claimed is:

1. A control system (20) for an automatic motor vehicle transmission (10), with a number of gear selection modules (38, 40, 42), each of which is respectively designed to preset a target gear (zg) for a gear change depending on a number of operating parameters, and with a number of analysis modules (46, 48, 50), each of which, in a respectively predeterminable operating situation, generates a suppression signal (u) for preventing a gear change, where each analysis module (46, 48, 50) is associated with a respective filter element (52, 54, 56), which enables the transmission of the respective suppression signal (u), depending on which gear selection module (38, 40, 42) has preset the target gear (zg).

2. The control system (20) according to claim 1, whose filter elements (52, 54, 56) can be controlled by a central control module (60).

3. The control system (20) according to claim 2, whose central control module (60) contains information, in the form of an applicable matrix for each analysis module (46, 48, 50), which indicates the target gear (zg)-presetting gear selection module (38, 40, 42) for which the suppression signal (u) is to be transmitted.

4. The control system (20) according to claim 2, whose central control module (60) is connected on the output side to each analysis module (46, 48, 50) in order to transmit an enable signal (f).

5. The control system (20) according to claim 1, whose gear selection modules (38, 40, 42), in chronological connection with the presetting of a target gear (zg), respectively send a signal (K), which identifies the presetting gear selection module (38, 40, 42), to the filter elements (52, 54, 56) or to the central control module (60).

6. A method for operating a control system (20) for an automatic motor vehicle transmission (10), with a number of gear selection modules (38, 40, 42, each of which is respectively designed to preset a target gear (zg) for a gear change depending on a number of operating parameters, and with a number of analysis module (46, 48, 50), each of which, in a respectively predeterminable operating situation, generates a suppression signal (u) for preventing a gear change, where the transmission of a suppression signal (u) generated by an analysis module is enabled depending on which gear selection module (38, 40, 42) has preset the target gear (zg).

* * * * *